(12) United States Patent
Choi et al.

(10) Patent No.: US 10,385,467 B2
(45) Date of Patent: Aug. 20, 2019

(54) METAL NANOLAMINATES AND MANUFACTURING METHOD THEREOF

(71) Applicants: Korea Institute of Science and Technology, Seoul (KR); Korea University Research and Business Foundation, Seoul (KR)

(72) Inventors: Insuk Choi, Seoul (KR); Young Keun Kim, Seoul (KR)

(73) Assignees: Korea Institute of Science and Technology, Seoul (KR); Korea University Research and Business Foundation, Seoul (KR)

( * ) Notice: Subject to any disclaimer, the term of this patent is extended or adjusted under 35 U.S.C. 154(b) by 113 days.

(21) Appl. No.: 15/581,903

(22) Filed: Apr. 28, 2017

(65) Prior Publication Data

US 2017/0314152 A1    Nov. 2, 2017

(30) Foreign Application Priority Data

May 2, 2016    (KR) .................. 10-2016-0054103

(51) Int. Cl.
*B32B 15/01*    (2006.01)
*C25D 1/00*    (2006.01)
*C25D 3/12*    (2006.01)
*C25D 3/48*    (2006.01)
*C25D 1/04*    (2006.01)
(Continued)

(52) U.S. Cl.
CPC ............... *C25D 1/006* (2013.01); *C25D 1/04* (2013.01); *C25D 3/12* (2013.01); *C25D 3/48* (2013.01); *C25D 5/12* (2013.01); *C25D 11/045* (2013.01); *B82B 1/008* (2013.01); *B82B 3/0014* (2013.01); *C23C 28/02* (2013.01);
(Continued)

(58) Field of Classification Search
None
See application file for complete search history.

(56) References Cited

U.S. PATENT DOCUMENTS 9,175,412 B2     11/2015   Kim et al.
2004/0178076 A1*  9/2004   Stonas ................ B01J 13/0047
                                                       205/74

FOREIGN PATENT DOCUMENTS

CN         102050426         *  5/2011  ............... B82B 3/00
KR      10-2002-0042680 A      6/2002
(Continued)

OTHER PUBLICATIONS

Prida et al., "Electroplating and magnetostructural characterization of multisegmented Co54Ni46/Co85Ni15 nanowires from single electrochemical bath in anodic alumina templates", Jun. 2013, Nanoscale Research Letters, vol. 8, pp. 1-7.*
(Continued)

*Primary Examiner* — Seth Dumbris
(74) *Attorney, Agent, or Firm* — NSIP Law

(57) ABSTRACT

A metal nanolaminate includes a plurality of units stacked in a longitudinal direction of the metal nanolaminate. Each of the units includes a first layer and a second layer stacked in the longitudinal direction. The first layer includes a first metal material formed of a first metallic element and the second layer includes the first metal material and a second metal material formed of a second metallic element. Each of the first layer and the second layer has a thickness of at least 5 nm but less than 100 nm in the longitudinal direction.

18 Claims, 11 Drawing Sheets

(51) Int. Cl.
*C25D 5/12* (2006.01)
*C25D 11/04* (2006.01)
*B82B 1/00* (2006.01)
*B82B 3/00* (2006.01)
*C23C 28/02* (2006.01)

(52) U.S. Cl.
CPC .................. *Y10T 428/12868* (2015.01); *Y10T 428/12875* (2015.01); *Y10T 428/12944* (2015.01)

(56) References Cited

FOREIGN PATENT DOCUMENTS

KR  10-2008-0039724 A  5/2008
WO  WO 01-23645 A1  4/2001

OTHER PUBLICATIONS

An et al., "Ultrahigh Tensile Stregnth Nanowires with a Ni/Ni—Au Multilayer Nanocrystalline Structure", May 2016, Nano Lett., vol. 16, pp. 3500-3506.*

* cited by examiner

EMBODIMENT 1

EMBODIMENT 2

EMBODIMENT 3

EMBODIMENT 4

COMPARISON EXAMPLE 1

COMPARISON EXAMPLE 2

COMPARISON EXAMPLE 3

METAL NANOLAMINATES AND MANUFACTURING METHOD THEREOF

CROSS-REFERENCE TO RELATED APPLICATION

This application claims the benefit of Korean Patent Application No. 10-2016-0054103, filed on May 2, 2016, in the Korean Intellectual Property Office, the disclosure of which is incorporated herein in its entirety by reference.

BACKGROUND

1. Field

One or more embodiments relate to a metal nanolaminate and a method of manufacturing the same.

2. Description of the Related Art

There has been a lot of research into a metal nanowire due to its excellent electrical conductivity, flexibility and mechanical properties. The mechanical properties of a metal nanowire usually improve as the radius of the metal nanowire decreases. Accordingly, research into the excellent mechanical properties of a metal nanowire is mostly targeted on metal nanowires having a diameter less than 100 nm.

However, reducing the diameter of a metal nanowire to improve the mechanical properties thereof involves structural limitations. A flawless mono-crystalline metal nanowire may have a tensile strength of about 2 Gpa when the metal nanowire has a diameter less than 100 nm. However, processes of manufacturing the flawless mono-crystalline metal nanowire are complex and require vacuum facilities. In particular, the flawless mono-crystalline metal nanowire has low tensile strength as compared to compressive strength, and therefore, it is actually hard to directly use metal nanowires in the various fields of technology.

SUMMARY

One or more embodiments include a metal nanolaminate having high tensile strength and a method of manufacturing the same.

Additional aspects will be set forth in part in the description which follows and, in part, will be apparent from the description, or may be learned by practice of the presented embodiments.

According to one or more embodiments, a metal nanolaminate includes a plurality of units stacked in a longitudinal direction of the metal nanolaminate. Each of the units includes a first layer and a second layer stacked in the longitudinal direction. The first layer includes a first metal material formed of a first metallic element and the second layer includes the first metal material and a second metal material formed of a second metallic element. Each of the first layer and the second layer has a thickness of at least 5 nm but less than 100 nm in the longitudinal direction.

The second layer may contain 3 to 15 atomic percent of the second metallic element.

The first metallic element and the second metallic element may have the same crystal structure and the second metallic element may have a larger lattice constant than the first metallic element.

The second metal material may include clusters of the second metallic element dispersed in the first metal material.

The second layer may include a first interlayer in an area adjacent to the first layer and the amount of the second metallic element contained in the first interlayer may gradually decrease from the second layer toward the first layer.

The second layer may further include a second interlayer at a side opposite to the first interlayer. The second interlayer may border a first layer of a neighboring unit and the amount of the second metallic element contained in the second interlayer may gradually decrease from the second layer toward the first layer of the neighboring unit.

The first metallic element may be nickel and the second metallic element may be gold.

A cut surface of the metal nanolaminate cut by tensile strength may be perpendicular to the longitudinal direction.

The metal nanolaminate may be cut without plastic deformation.

A grain size of the first metal material contained in the second layer and a grain size of the second metal material contained in the second layer may be smaller than a grain size of the first metal material contained in the first layer.

The metal nanolaminate further includes a hollow extending along the longitudinal direction at a center of the metal nanolaminate.

According to one or more embodiments, a method of manufacturing a metal nanolaminate includes forming a working electrode at one side of an anodic aluminum oxide template including at least one hole; dipping the anodic aluminum oxide template and an opposite electrode into a solution containing a first metallic element and a second metallic element; and applying a pulse voltage between the working electrode and the opposite electrode to form a metal nanolaminate in the at least one hole. A first layer and a second layer are formed to be alternately stacked in the metal nanolaminate. The first layer is formed of a first metal material formed of the first metallic element. The second layer is formed of the first metal material and a second metal material formed of the second metallic element. Each of the first layer and the second layer has a thickness of at least 5 nm but less than 100 nm in a stack direction.

A magnitude of the pulse voltage applied to form the second layer may be greater than a magnitude of the pulse voltage applied to form the first layer and the second layer may contain 3 to 15 atomic percent of the second metallic element.

When the second layer is formed, clusters of the second metallic element may be formed in the first metal material.

The second layer may include an interlayer in an area adjacent to the first layer and the amount of the second metallic element contained in the interlayer may gradually decrease toward the first layer.

The first metallic element may be nickel and the second metallic element may be gold. The solution may contain nickel sulfate hexahydrate and potassium dicyanoaurate.

A grain size of the first metal material contained in the second layer and a grain size of the second metal material contained in the second layer may be smaller than a grain size of the first metal material contained in the first layer.

The working electrode may be formed of silver and the opposite electrode may be formed of platinum.

The method further includes eliminating the anodic aluminum oxide template with a sodium hydroxide solution and rinsing the metal nanolaminate with deionized water.

The metal nanolaminate may be formed to include a hollow extending along a longitudinal direction of the metal nanolaminate at a center of the metal nanolaminate.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
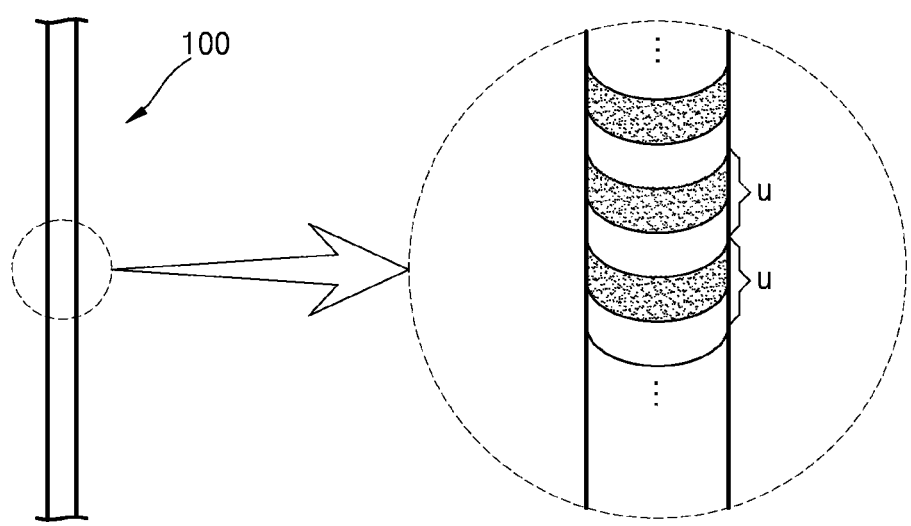
FIG. 1 is a schematic perspective view of a metal nanolaminate according to some embodiments of the inventive concept.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

It will be understood that, although the terms first, second, etc. may be used herein to describe various elements, these elements should not be limited by these terms. These terms are only used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. In the drawings, elements are exaggerated or omitted or are schematically illustrated for clarity and the size of the elements may not completely reflect an actual size.

It will also be understood that when a layer is referred to as being "on" or "under" another layer or substrate, it can be directly on or under the other layer or substrate, or intervening layers may also be present and will be described based on the drawings.

The inventive concept will now be described more fully with reference to the accompanying drawings, in which exemplary embodiments of the inventive concept are shown. Like reference numerals in the drawings denote like elements, and thus their description will be omitted.

Figure 2:
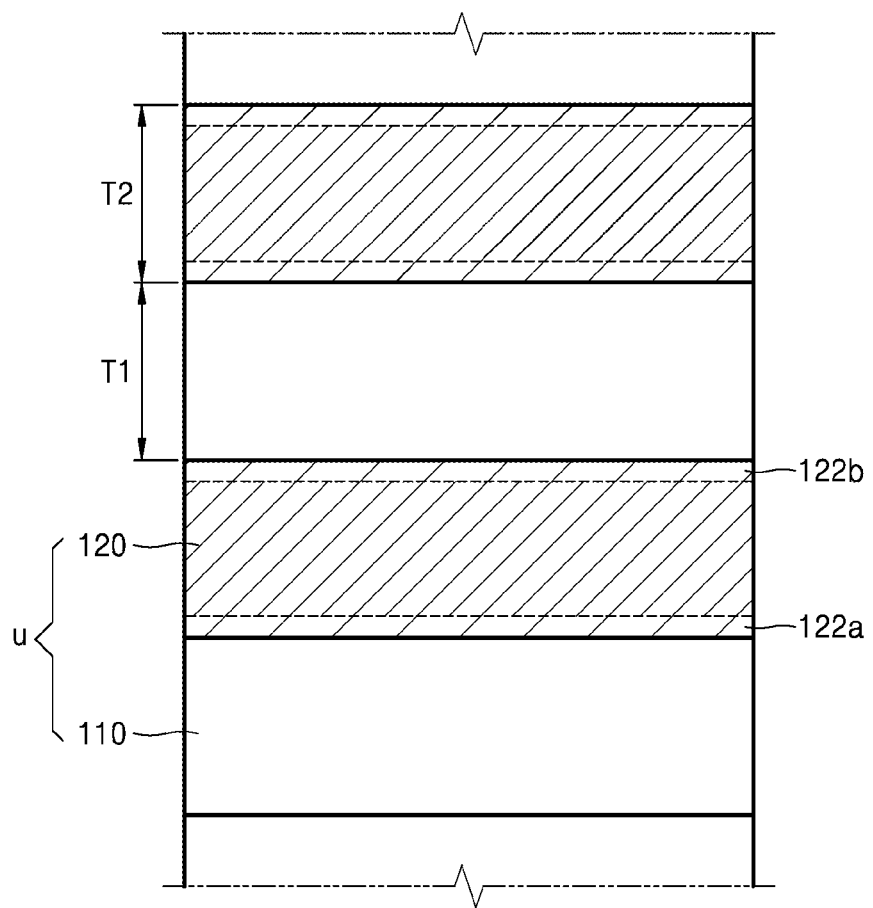
FIG. 2 is a schematic sectional view of a unit of the metal nanolaminate illustrated in FIG. 1.

FIG. 1 is a schematic perspective view of a metal nanolaminate according to some embodiments of the inventive concept. FIG. 2 is a schematic sectional view of a unit of the metal nanolaminate illustrated in FIG. 1.

Referring to FIGS. 1 and 2, a metal nanolaminate 100 may include a plurality of units "u" stacked up in a longitudinal direction of the metal nanolaminate 100. Each of the units "u" may include a first layer 110 and a second layer 120 which are stacked up in the longitudinal direction. Although it is illustrated in FIGS. 1 and 2 that the first layer 110 and the second layer 120 are sequentially stacked up in each unit "u", the inventive concept is not limited thereto and the stack order of the first and second layers 110 and 120 may be reversed. Although the metal nanolaminate 100 has a shape of a nanowire in the embodiments illustrated in FIG. 1, the inventive concept is not limited thereto and the section of the metal nanolaminate 100, taken along a horizontal direction perpendicular to the longitudinal direction, may have various shapes such as a triangle and a polygon apart from a circle.

The first layer 110 may include a first metal material and the second layer 120 may include the first metal material and a second metal material different from the first metal material. The first metal material may be formed of a first metallic element and the second metal material may be formed of a second metallic element.

The second metal material may be dispersed in the second layer 120. For example, the second metal material may include clusters evenly distributed in a matrix formed of the first metal material. The first metallic element and the second metallic element may have a relationship in which the first and second metallic elements do not form a solid solution alloy when the first metallic element and the second metallic element are mixed with each other. Accordingly, phase separation occurs between the first metal material and the second metal material when the second layer 120 is formed, so that crystal grains of the second metal material are formed in the first metal material.

As described above, since crystals of the first metal material and crystals of the second metal material, which are distinguishable from each other, exist together in the second layer 120, a matrix formed of the first metal material in the second layer 120 may have a different structure than the first layer 110.

In addition, as will be described later, since a voltage used to form the second layer 120 is greater than a voltage used to form the first layer 110 when the metal nanolaminate 100 is formed using electrodeposition, the grain size of the first and second metal materials contained in the second layer 120 may be smaller than that of the first metal material contained in the first layer 110.

Therefore, there may be a change in grain size between the first layer 110 and the second layer 120, and incoherent interfaces including grain boundaries of the first metal material and a phase boundary between the first metal material and the second metal material may be formed between the first layer 110 and the second layer 120. These incoherent interfaces may block the propagation of dislocation occurring in the metal nanolaminate 100 and suppress the formation of a shear band, thereby increasing the tensile strength of the metal nanolaminate 100.

When tensile strength is applied to a metal nanowire which does not include incoherent interfaces, shear deformation usually occurs due to grain boundary sliding and the formation of a shear band, and therefore, the metal nanowire is cut. At this time, the cut surface of the metal nanowire may be oblique to the longitudinal direction of the metal nanowire at an angle of about 30 to 50 degrees.

Contrarily, when the metal nanolaminate 100 includes incoherent interfaces as shown in the embodiments of the inventive concept, the propagation of dislocation is blocked and the formation of a shear band is suppressed due to the incoherent interfaces, and therefore, shear deformation does not occur. However, when tensile strength greater than tensile strength of the metal nanolaminate 100 is applied to the metal nanolaminate 100, the metal nanolaminate 100 may be cut so that the cut surface of the metal nanolaminate 100 is perpendicular to the longitudinal direction. In addition, since grain boundary sliding is blocked by the incoherent interfaces, the metal nanolaminate 100 may be cut without plastic deformation.

For example, each of the first layer 110 and the second layer 120 may be formed to a thickness less than 100 nm. When the thickness of the first and second layers 100 and 120 is less than 100 nm, the gap between neighboring incoherent interfaces decreases and does not satisfy a thickness for the formation of a shear band and grain boundary sliding. As a result, usual shear deformation in which the cut surface of the metal nanolaminate 100 is oblique to the longitudinal direction of the metal nanolaminate 100 may be prevented. However, when tensile strength greater than tensile strength of the metal nanolaminate 100 is applied to the metal nanolaminate 100, the metal nanolaminate 100 is cut and has a cut surface perpendicular to the longitudinal direction. At this time, the tensile strength applied to the metal nanolaminate 100 may be remarkably greater than tensile strength causing usual shear deformation.

Each of the first and second layers 110 and 120 of the metal nanolaminate 100 may have a thickness of at least 5 nm. As will be described later, the first layer 110 and the second layer 120 may be alternately formed in the metal nanolaminate 100 using electrodeposition. At this time, a voltage used to form the first layer 110 may be different from that used to form the second layer 120. When the first layer 110 and the second layer 120 have a thickness less than 5 nm, the frequency of a pulse voltage used to form the first layer 110 and the second layer 120 needs to be increased, and therefore, it may be hard to allow the second metal material to be satisfactorily included in the second layer 120. As a result, it may be hard to form an incoherent interface with a strong bond between the first layer 110 and the second layer 120. Therefore, the first layer 110 and the second layer 120 may be formed to a thickness of at least 5 nm but less than 100 nm to increase the tensile strength of the metal nanolaminate 100.

The second layer 120 may contain 3 to 15 atomic percent of the second metallic element. When the second metallic element is less than 3 atomic percent in the second layer 120, the amount of the second metal material contained in the second layer 120 may be too small to form incoherent interfaces, which block the propagation of dislocation between the first layer 110 and the second layer 120.

Contrarily, a deposition time for the second layer 120 needs to be increased to allow the second metallic element to be more than 15 atomic percent in the second layer 120. However, when the deposition time increases, the thickness of the second layer 120 and the gap between incoherent interfaces also increase, and therefore, it may be hard to prevent the formation of a shear band and block the propagation of dislocation occurring in the first layer 110 or the second layer 120. Consequently, 3 to 15 atomic percent of the second metallic element may be contained in the second layer 120.

Meanwhile, the second metallic element may have a larger lattice constant than the first metallic element. The first metallic element and the second metallic element may have the same crystal structure. For example, when the first metallic element and the second metallic element have a face-centered cubic (FCC) structure, the lattice constant of the second metallic element may be at least 115% of that of the first metallic element to create a structural difference between the first layer 110 and the second layer 120.

The first metallic element may be nickel (Ni) and the second metallic element may be gold (Au). However, the inventive concept is not limited thereto and the first and second metallic elements may be selected from among elements that satisfy the above-described conditions such as a relationship in which elements do not form a solid solution alloy.

Meanwhile, the second layer 120 may include a first interlayer 122a in an area adjacent to the first layer 110. The amount of second metallic element contained in the first interlayer 122a may gradually decrease from the second layer 120 toward the first layer 110. In other words, the phase between the first layer 110 and the second layer 120 continuously changes in the first interlayer 122a, and therefore, the first interlayer 122a may be formed in continuity with the first and second layers 110 and 120. Since the first layer 110 and the second layer 120 may be integrated with each other by the first interlayer 122a, the first layer 110 and the second layer 120 may strongly bond together.

In the same manner, the second layer 120 may also include a second interlayer 122b at a side opposite to the first interlayer 122a. The second interlayer 122b may border the first layer 110 of a neighboring unit. The amount of second metallic element contained in the second interlayer 122b may gradually decrease from the second layer 120 toward the first layer 110 of the neighboring unit. Accordingly, the plurality of the units "u" may strongly bond together throughout the whole length of the metal nanolaminate 100.

Figure 3:
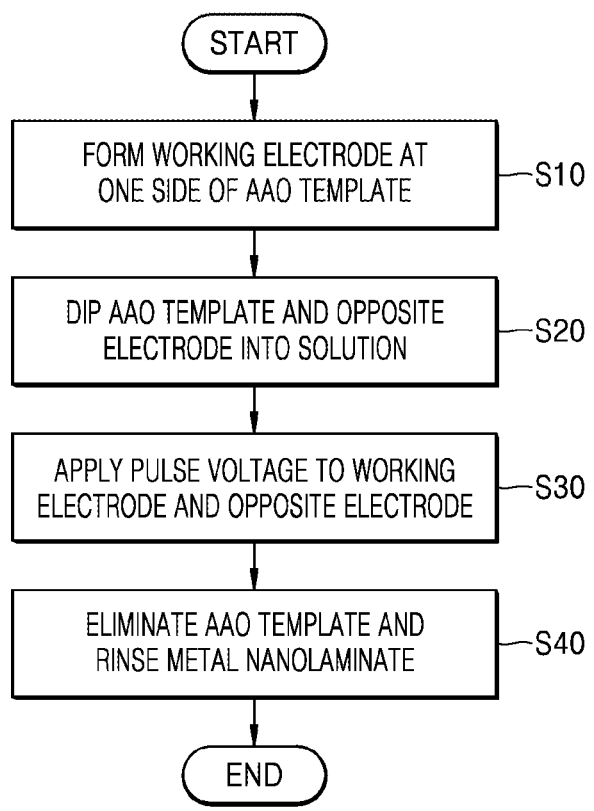
FIG. 3 is a schematic flowchart of a procedure for manufacturing the metal nanolaminate illustrated in FIG. 1.

FIG. 3 is a schematic flowchart of a procedure for manufacturing the metal nanolaminate 100 illustrated in FIG. 1. A method of manufacturing the metal nanolaminate 100 will be described with reference to FIGS. 2 and 3.

The method of manufacturing the metal nanolaminate 100 may include forming a working electrode at one side of an anodic aluminum oxide (AAO) template including at least one hole in operation S10, dipping the AAO template and an opposite electrode into a solution containing a first metallic element and a second metallic element in operation S20, applying a pulse voltage between the working electrode and the opposite electrode to form a metal nanolaminate in the at least one hole in operation S30, and eliminating the AAO template with a sodium hydroxide solution and rinsing the metal nanolaminate with deionized water in operation S40.

The AAO template may include at least one hole. The horizontal section of the hole included in the AAO template may have various shapes such as a circle, a triangle, and a polygon. A pillar may be positioned at the center of the hole to form a doughnut shape.

The working electrode formed at one side of the AAO template may be formed of silver. The working electrode may be formed at one side of the AAO template using electron beam vapor deposition.

The solution into which the AAO template and the opposite electrode are dipped may include the first metallic element and the second metallic element. When the first metallic element is Ni and the second metallic element is Au, the solution may contain nickel sulfate hexahydrate and potassium dicyanoaurate. The opposite electrode may be formed of platinum.

After dipping the AAO template and the opposite electrode into the solution, the pulse voltage is applied to the working electrode and the opposite electrode to grow the metal nanolaminate 100 in the hole of the AAO template. At this time, the magnitude of a first voltage applied to form the first layer 110 may be different from that of a second voltage applied to form the second layer 120. For example, when the first layer 110 is formed of Ni and the second layer 120 is formed of a mixture layer of Ni and Au, the magnitude of the second voltage may be greater than that of the first voltage. When the first voltage and the second voltage are alternately applied, the first layer 110 and the second layer 120 may be alternately formed in the hole of the AAO template.

The thickness of the first and second layers 110 and 120 may be adjusted according to a deposition time. The shape of the metal nanolaminate 100 may be formed according to the shape of the hole of the AAO template.

After the metal nanolaminate 100 is formed, the AAO template may be eliminated using the sodium hydroxide solution and the metal nanolaminate 100 may be rinsed using the deionized water. As a result, the metal nanolaminate 100 may be manufactured.

Figure 4:
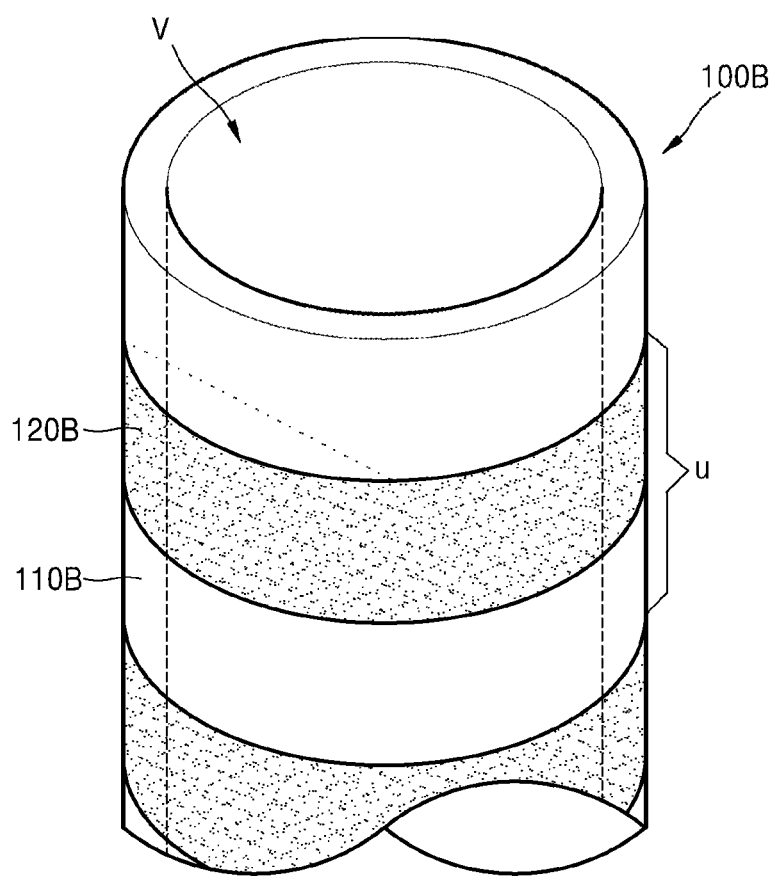
FIGS. 4 and 5 are schematic perspective views of metal nanolaminates according to different embodiments of the inventive concept.
Figure 5:
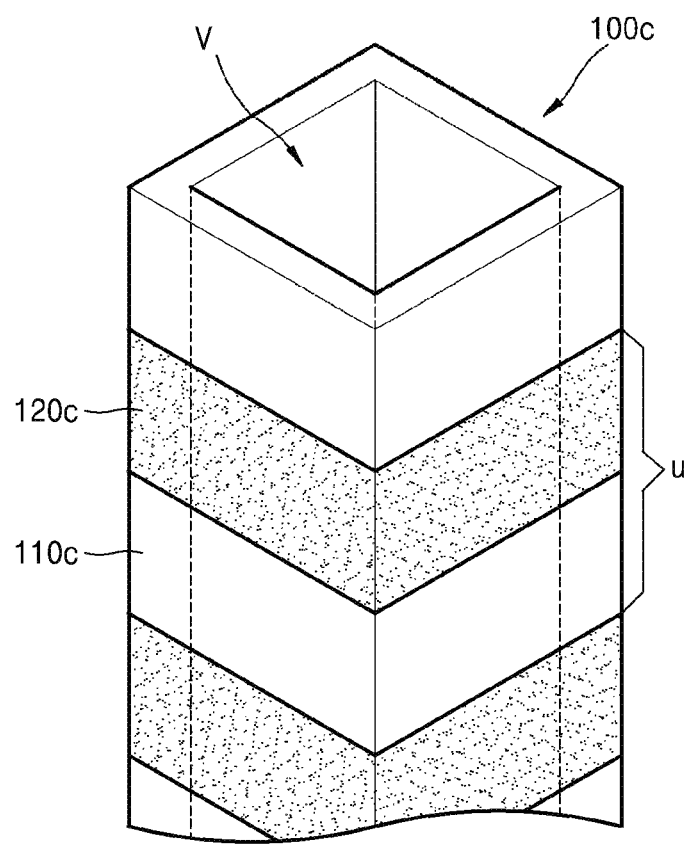

FIGS. 4 and 5 are schematic perspective views of metal nanolaminates according to different embodiments of the inventive concept.

Referring to FIG. 4, a metal nanolaminate 100B may include a plurality of units "u" in a longitudinal direction. Each of the units "u" may include a first layer 110B and a second layer 120B which are stacked up in the longitudinal direction. The first layer 110B and the second layer 120B are the same as the first layer 110 and the second layer 120 which have been described with reference to FIGS. 1 and 2. Thus redundant descriptions thereof will be omitted.

The metal nanolaminate 100B may include a hollow V extending along the longitudinal direction at the center thereof. The hollow V of the metal nanolaminate 100B illustrated in FIG. 4 is of a cylindrical shape. The size or diameter of the hollow V, i.e., the size of the horizontal section of the hollow V perpendicular to the longitudinal direction of the metal nanolaminate 100B, may range from several nm to several tens of μm.

The metal nanolaminate 100B including the hollow V may be formed using an AAO template including a doughnut-shaped hole, with a pillar in the middle.

However, the inventive concept is not limited thereto and the size and the shape of the hollow V may vary.

Like the metal nanolaminate 100B illustrated in FIG. 4, a metal nanolaminate 100C illustrated in FIG. 5 may include a plurality of units "u" in a longitudinal direction. Each of the units "u" may include a first layer 110C and a second layer 120C which are stacked up in the longitudinal direction. The metal nanolaminate 100C may include the hollow V extending along the longitudinal direction at the center thereof. However, the hollow V of the metal nanolaminate 100C illustrated in FIG. 5 is of a rectangular shape. The metal nanolaminate 100C may be formed using an AAO template including a rectangular hole, with a rectangular pillar in the middle.

Hereinafter, the inventive concept will be described in detail by explaining embodiments below. The embodiments should be considered in descriptive sense only and not for purposes of limitation. The embodiments relate to metal nanolaminates having a shape of a nanowire. To avoid confusion between the embodiments and comparison examples that do not have a stack structure, metal nanolaminates according to the embodiments will be referred to as metal nanowires.

1. Manufacturing of Metal Nanowire

Figure 6:
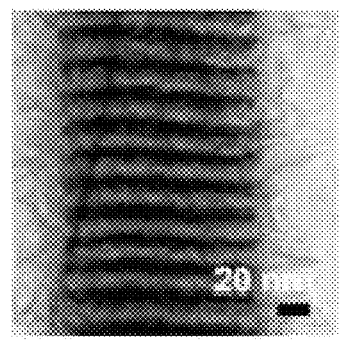
FIG. 6 is a diagram showing metal nanolaminates respectively according to Embodiments 1 to 4 shown in Table 1.
Figure 6:
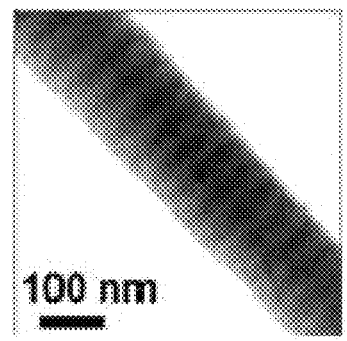
Figure 6:
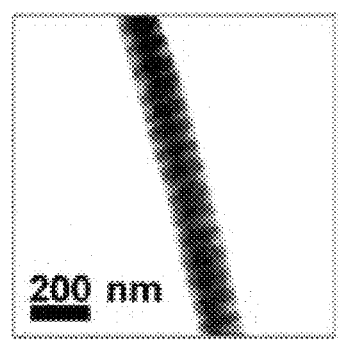
Figure 6:
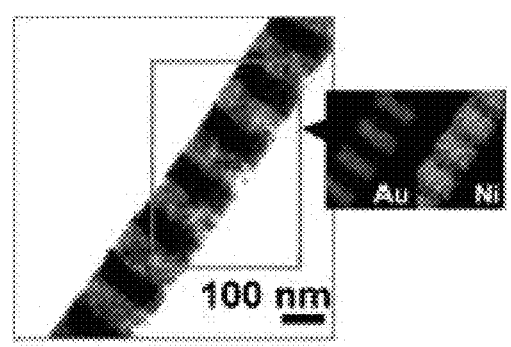
Figure 7:
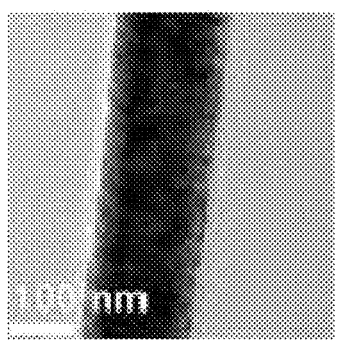
FIG. 7 is a diagram showing metal nanolaminates respectively according to Comparison Examples 1 to 3 shown in Table 1.
Figure 7:
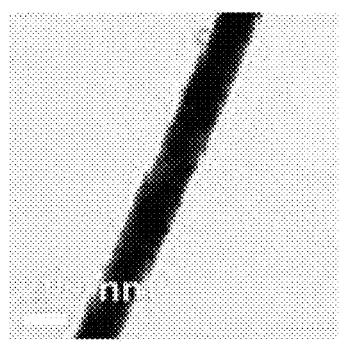
Figure 7:
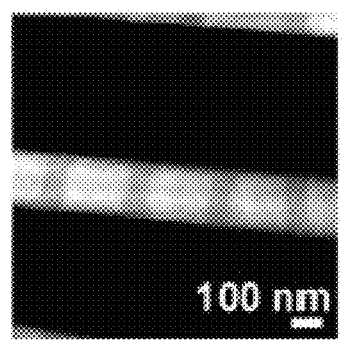

Metal nanowires are manufactured using an AAO template including a plurality of nanoholes having a diameter of 140 to 240 nm in Embodiments 1 to 4 and Comparison Examples 1 to 3 shown in Table 1. FIG. 6 is a diagram of metal nanowires respectively according to Embodiments 1 to 4 shown in Table 1. FIG. 7 is a diagram of metal nanowires respectively according to Comparison Examples 1 to 3 shown in Table 1.

In detail, the metal nanowires were manufactured by forming a silver electrode to a thickness of 300 nm at one side of an AAO template using electron beam vapor deposition, dipping the AAO template and a nickel electrode plate into a solution adjusted to have a pH of 3 with boric acid, and applying a voltage to the silver electrode and the nickel electrode plate. After manufacturing the metal nanowires, the AAO template was eliminated with a 6M sodium hydroxide solution and the metal nanowires were rinsed with deionized water.

When the metal nanowires were manufactured in Embodiments 1 to 4 and Comparison Example 3, the first layer 110 (in FIG. 2) (hereinafter, referred to as a Ni layer) and the second layer 120 (in FIG. 2) (hereinafter, referred to as a Ni(Au) layer) were formed respectively at a current density of 0.5 mA/cm$^2$ and a current density of 10 mA/cm$^2$. The thickness of the Ni layer and the Ni(Au) layer was adjusted according to a deposition time. The metal nanowire was composed of a Ni layer only in Comparison Example 1 and the metal nanowire was composed of a Ni(Au) layer only in Comparison Example 2.

TABLE 1

| | Thickness of Ni layer | Thickness of Ni(Au) layer | Notes |
|---|---|---|---|
| Embodiment 1 | 10 nm | 10 nm | |
| Embodiment 2 | 25 nm | 20 nm | |
| Embodiment 3 | 30 nm | 40 nm | |
| Embodiment 4 | 60 nm | 70 nm | |
| Comparison Example 1 | — | — | Composed of Ni layer only |
| Comparison Example 2 | — | — | Composed of Ni(Au) layer only |
| Comparison Example 3 | 70 nm | 200 nm | |

2. Analysis of Components of Metal Nanowire

Figure 8:
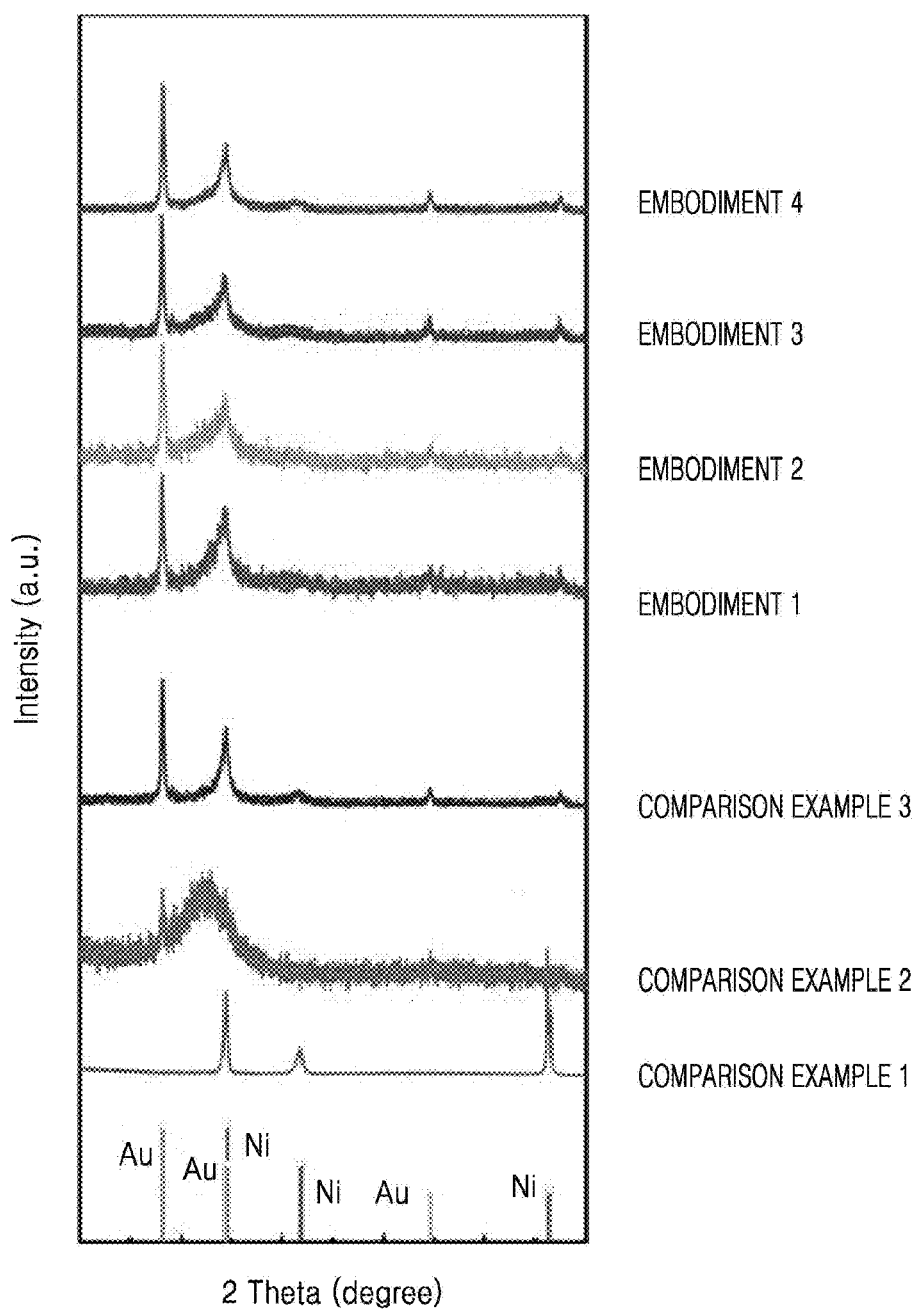
FIG. 8 is a diagram of the result of x-ray diffraction (XRD) analysis of the metal nanolaminates respectively according to Embodiments 1 to 4 and Comparison Examples 1 to 3 shown in Table 1.
Figure 9A:
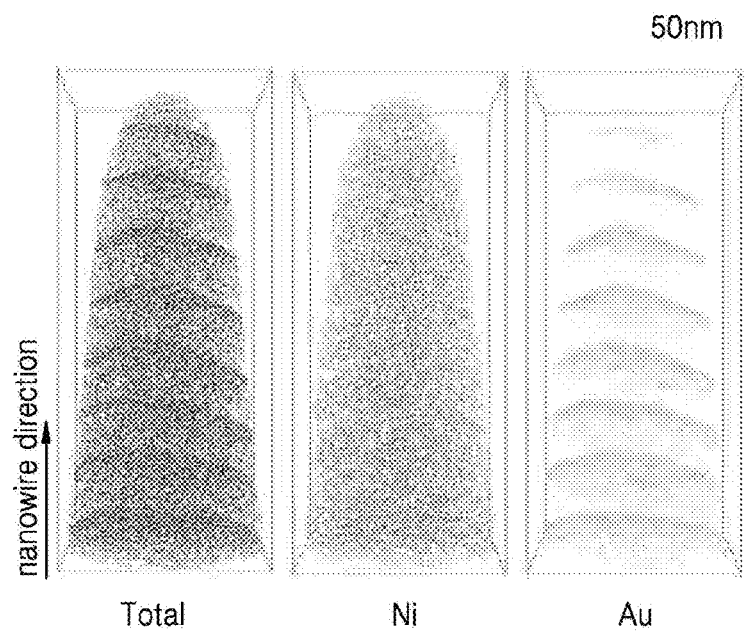
FIGS. 9A and 9B are diagrams of the result of analyzing the composition of the metal nanolaminate according to Embodiment 1 in Table 1 using a three-dimensional atomic force microscope.
Figure 9B:
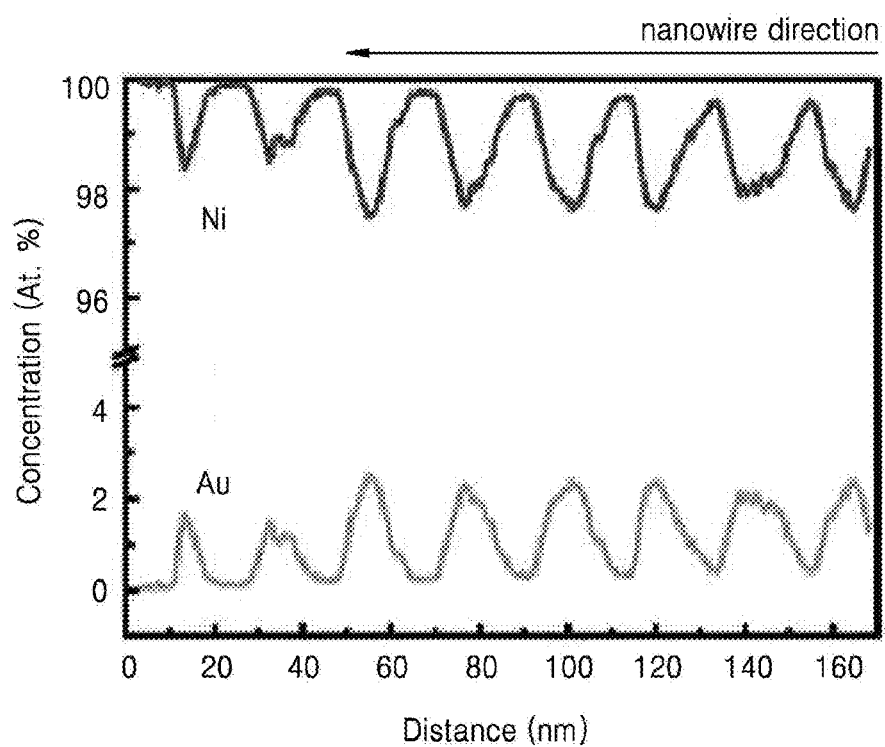

FIG. 8 is a diagram of the result of x-ray diffraction (XRD) analysis of the metal nanowires respectively according to Embodiments 1 to 4 and Comparison Examples 1 to 3 shown in Table 1. FIGS. 9A and 9B are diagrams of the result of analyzing the composition of the metal nanowire according to Embodiment 1 in Table 1 using a three-dimensional atomic force microscope.

Ni peaks having a typical FCC structure are observed in the result of the XRD analysis of the metal nanowire manufactured in Comparison Example 1. Contrarily, it is observed in the result of the XRD analysis of the metal nanowire manufactured in Comparison Example 2 that Ni peaks are shifted and wide, but Au peaks having the FCC structure are relatively distinct.

In the XRD analysis result of Comparison Example 2, the occurrence of the distinct Au peaks indicates that Au elements have been extracted and have formed original crystal grains and the wide Ni peaks indicate a very fine crystal grain structure. When the size of a crystal grain is calculated using the Scherrer equation, the size is 15 nm in Comparison Example 1 and the size is 3 nm in Comparison Example 2.

Meanwhile, in the XRD analysis result of Comparison Example 2, the shift of the Ni peaks is related to the change of a lattice constant of a matrix formed of Ni. Since Ni and Au do not thermodynamically mix with each other at room temperature in a binary system, it is expected that phase separation between Ni and Au occurs in the process of forming the Ni(Au) layer, but complete phase separation between Ni and Au may not actually occur due to fast deposition and Ni and Au may mingle together in the Ni(Au) layer.

In the XRD analysis results of Embodiments 1 to 4 and Comparison Example 3 shown in FIG. 8, Au peaks are relatively more intensive than Ni peaks and the Ni peaks are asymmetric. In other words, the XRD analysis results of Embodiments 1 to 4 and Comparison Example 3 are the same as the sum of the XRD analysis result of Comparison Example 1 and the XRD analysis result of Comparison Example 2, which means that the structure of the Ni layer coincides with the metal nanowire of Comparison Example 1 and the structure of the Ni(Au) layer coincides with the metal nanowire of Comparison Example 2.

In other words, since Ni and Au distinguishable from each other mingle together in the second layer 120, the structure of a matrix formed of Ni in the second layer 120 is transformed to be different from the structure of the first layer 110 formed of Ni and the grain size of Ni and Au in the second layer 120 is smaller than that of Ni in the first layer 110, and therefore, an incoherent structure is formed to be strongly bonded between the first layer 110 and the second layer 120.

FIG. 9A shows, in three dimensions, the distribution of Ni atoms and Au atoms of the metal nanowire manufactured in Embodiment 1. It is seen that Ni layers are clearly distinguished from Ni(Au) layers and Au is phase-separated to form clusters in a Ni matrix. FIG. 9B shows the distribution of Ni atoms and Au atoms in the longitudinal direction of the metal nanowire manufactured in Embodiment 1. Referring to FIG. 9B, it can be seen that the interlayer 122a or 122b (in FIG. 2) in which the amount of Au element gradually increases or decreases is formed between a Ni layer and a Ni(Au) layer.

3. Measuring of Tensile Strength of Metal Nanowire

Figure 10A:
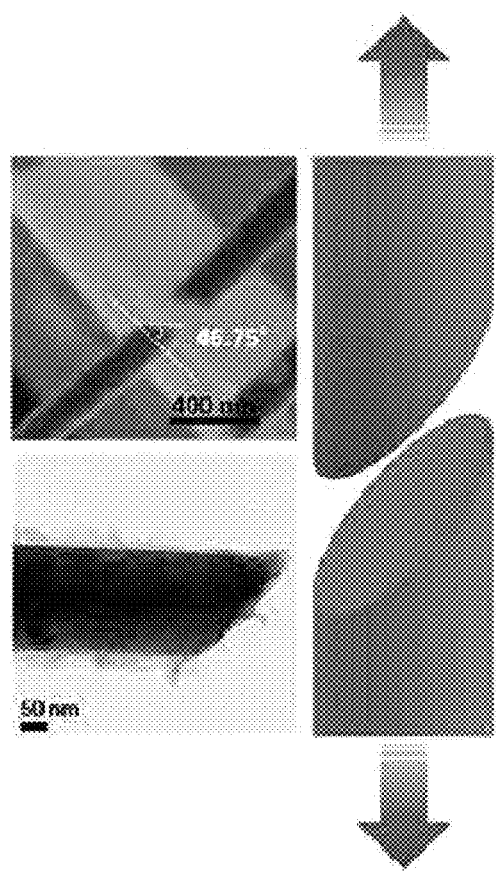
FIGS. 10A and 10B are diagrams of the types of cut of the metal nanolaminates respectively according to Embodiments 1 to 4 and Comparison Examples 1 to 3 shown in Table 1 with respect to tensile strength.
Figure 10B:
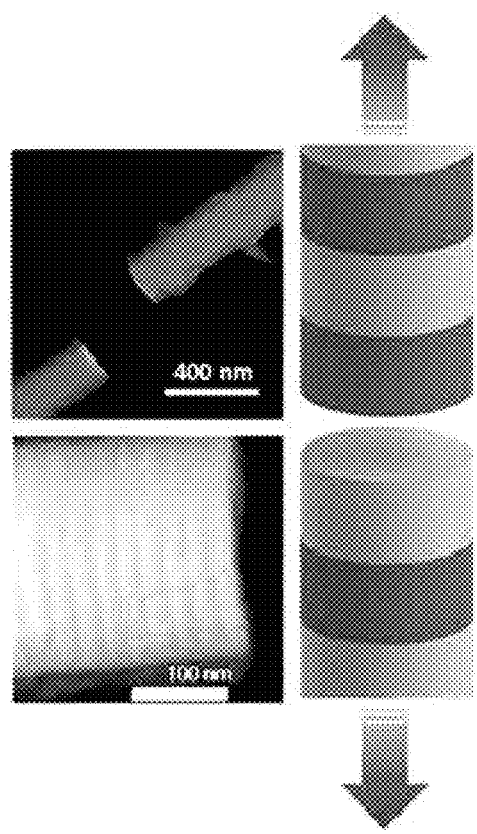
Figure 11:
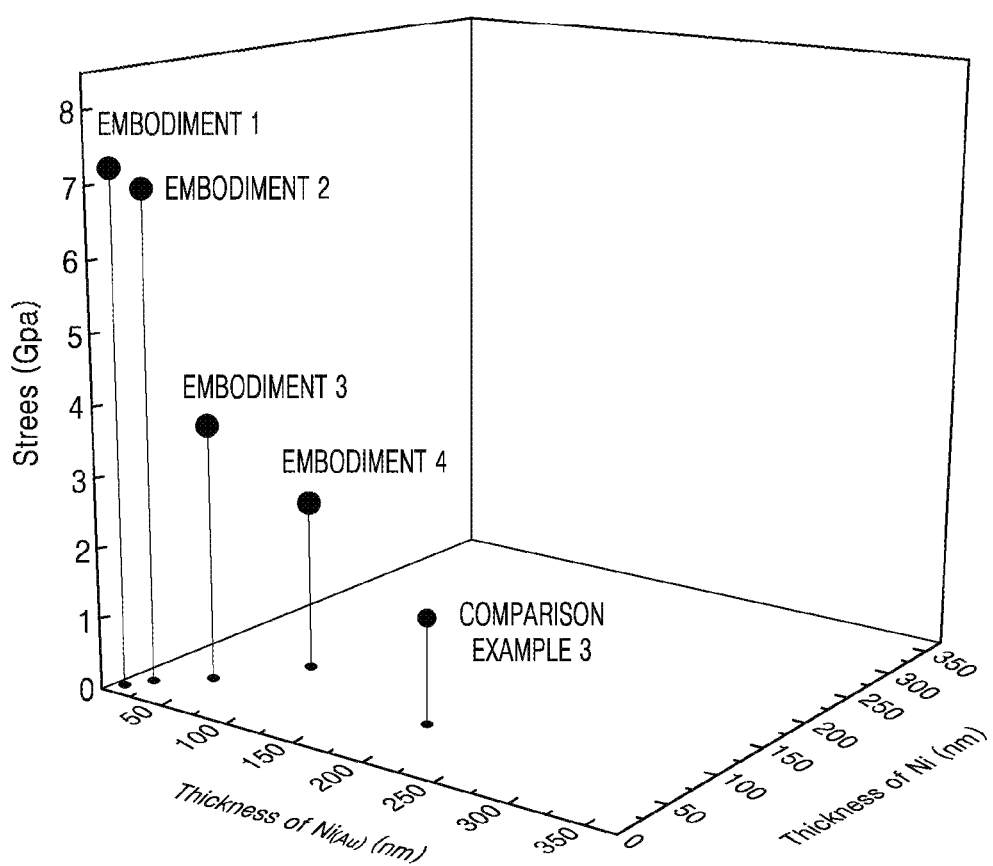
FIG. 11 is a diagram of the tensile strength of the metal nanolaminates respectively according to Embodiments 1 to 4 and Comparison Examples 1 to 3 shown in Table 1.

FIGS. 10A and 10B are diagrams of the types of cut of the metal nanowires respectively according to Embodiments 1 to 4 and Comparison Examples 1 to 3 shown in Table 1 with respect to tensile strength. FIG. 11 is a diagram of the tensile strength of the metal nanowires respectively according to Embodiments 1 to 4 and Comparison Examples 1 to 3 shown in Table 1.

FIG. 10A shows usual shear deformation in which a cut surface is oblique to the longitudinal direction of the metal nanowires. The metal nanowires manufactured in Comparison Examples 2 and 3 shown in Table 1 had this type of cut and the metal nanowire manufactured in Comparison Examples 1 was cut, partly showing the shear deformation shown in FIG. 10A.

However, since Ni layers and Ni(Au) layers are formed to a thickness of at least 5 nm but less than 100 nm in the metal nanowires of Embodiments 1 to 4, the propagation of dislocation is blocked and the formation of a shear band is suppressed due to incoherent interfaces. As a result, the shear deformation shown in FIG. 10A does not occur and the metal nanowires have cut surfaces perpendicular to the longitudinal direction thereof when the metal nanowires are cut. In addition, since grain boundary sliding is blocked by the incoherent interfaces, the metal nanowires are cut without plastic deformation. Meanwhile, tensile strength allowing the shear deformation shown in FIG. 10B to occur is greater than tensile strength allowing the shear deformation shown in FIG. 10A to occur.

For example, while the tensile strength of the metal nanowire of Comparison Example 1, which shows the shear deformation shown in FIG. 10A, is 1.52 Gpa, the tensile strength of the metal nanowire of Embodiment 1 may be 7.4 Gpa.

Referring to FIG. 11, it can be seen that as the thickness of Ni layers and Ni(Au) layers decreases, the tensile strength of the metal nanowires increases. Since the thickness of the Ni layers and the Ni(Au) layers is less than 100 nm even though the metal nanowires have a diameter greater than 100 nm in Embodiments 1 to 4, the tensile strength in Embodiments 1 to 4 increases as compared to that in Comparison Example 3. In particular, when the thickness of the Ni layers and the Ni(Au) layers is less than 30 nm, the tensile strength remarkably increases to 7.4 Gpa.

As described above, according to some embodiments of the inventive concept, the tensile strength of a metal nanolaminate remarkably increases even when the metal nanolaminate has a diameter greater than 100 nm.

In addition, since the metal nanolaminate is formed using electrodeposition, processes of manufacturing the metal nanolaminate are simplified and manufacturing speed is increased.

As described above, the metal nanolaminate manufactured according to some embodiments of the inventive concept has excellent tensile strength and may be formed in various sizes and shapes, and therefore, the metal nanolaminate can be directly used in the various fields of technology.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

What is claimed is:

1. A metal nanolaminate comprising a plurality of units stacked in a longitudinal direction of the metal nanolaminate, each of the units comprising a first layer and a second layer stacked in the longitudinal direction, the first layer comprising a first metal material formed of a first metallic element and the second layer comprising the first metal material and a second metal material formed of a second metallic element, wherein each of the first layer and the second layer has a thickness of at least 5 nm but less than 100 nm in the longitudinal direction, and wherein a phase separation occurs between the first metal material and the second metal material such that the second metal material comprises clusters of the second metallic element dispersed in the first metal material.

2. The metal nanolaminate of claim 1, wherein the second layer contains 3 to 15 atomic percent of the second metallic element.

3. The metal nanolaminate of claim 1, wherein the first metallic element and the second metallic element have the same crystal structure and the second metallic element has a larger lattice constant than the first metallic element.

4. The metal nanolaminate of claim 1, wherein the second layer comprises a first interlayer in an area adjacent to the first layer and the amount of the second metallic element contained in the first interlayer gradually decreases from the second layer toward the first layer.

5. The metal nanolaminate of claim 4, wherein the second layer further comprises a second interlayer at a side opposite to the first interlayer, the second interlayer borders a first layer of a neighboring unit, and the amount of the second metallic element contained in the second interlayer gradually decreases from the second layer toward the first layer of the neighboring unit.

6. The metal nanolaminate of claim 1, wherein the first metallic element is nickel and the second metallic element is gold.

7. The metal nanolaminate of claim 1, further comprising a cut surface, wherein the cut surface of the metal nanolaminate cut by tensile strength is perpendicular to the longitudinal direction.

8. The metal nanolaminate of claim 7, wherein the metal nanolaminate is cut without plastic deformation.

9. The metal nanolaminate of claim 1, wherein a grain size of the first metal material contained in the second layer and a grain size of the second metal material contained in the second layer are smaller than a grain size of the first metal material contained in the first layer.

10. The metal nanolaminate of claim 1, further comprising a hollow extending along the longitudinal direction at a center of the metal nanolaminate.

11. A method of manufacturing the metal nanolaminate of claim 1, the method comprising:
    forming a working electrode at one side of an anodic aluminum oxide template comprising at least one hole;
    dipping the anodic aluminum oxide template and an opposite electrode into a solution containing a first metallic element and a second metallic element; and
    applying a pulse voltage between the working electrode and the opposite electrode to form a metal nanolaminate in the at least one hole,
    wherein a first layer and a second layer are formed to be alternately stacked in the metal nanolaminate, the first layer is formed of a first metal material formed of the first metallic element, the second layer is formed of the first metal material and a second metal material formed of the second metallic element, and each of the first layer and the second layer has a thickness of at least 5 nm but less than 100 nm in a stack direction, and
    wherein a phase separation occurs between the first metal material and the second metal material such that the second metal material comprises clusters of the second metallic element dispersed in the first metal material.

12. The method of claim 11, wherein a magnitude of the pulse voltage applied to form the second layer is greater than a magnitude of the pulse voltage applied to form the first layer and the second layer contains 3 to 15 atomic percent of the second metallic element.

13. The method of claim 11, wherein the second layer comprises an interlayer in an area adjacent to the first layer and the amount of the second metallic element contained in the interlayer gradually decreases toward the first layer.

14. The method of claim 11, wherein the first metallic element is nickel, the second metallic element is gold, and the solution contains nickel sulfate hexahydrate and potassium dicyanoaurate.

15. The method of claim 11, wherein a grain size of the first metal material contained in the second layer and a grain size of the second metal material contained in the second layer are smaller than a grain size of the first metal material contained in the first layer.

16. The method of claim 11, wherein the working electrode is formed of silver and the opposite electrode is formed of platinum.

17. The method of claim 11, further comprising eliminating the anodic aluminum oxide template with a sodium hydroxide solution and rinsing the metal nanolaminate with deionized water.

18. The method of claim 11, wherein the metal nanolaminate is formed to comprise a hollow extending along a longitudinal direction of the metal nanolaminate at a center of the metal nanolaminate.

* * * * *